United States Patent [19]
Watkins

[11] 4,109,928
[45] Aug. 29, 1978

[54] SECTIONAL GRAIN DRILL HITCH

[75] Inventor: James F. Watkins, Alexandria, Minn.

[73] Assignee: Clyde Machines, Inc., Glenwood, Minn.

[21] Appl. No.: 737,521

[22] Filed: Nov. 1, 1976

[51] Int. Cl.² .............................................. B60D 1/14
[52] U.S. Cl. ................................ 280/411 R; 172/311; 280/492
[58] Field of Search ............ 280/411 R, 411 A, 411 B, 280/411 C, 412, 413, 491 R, 492, 493, 479 R, 479 A; 172/311, 456, 459, 474, 488

[56] References Cited

U.S. PATENT DOCUMENTS

| | | | |
|---|---|---|---|
| 2,328,343 | 8/1943 | Jacob | 280/490 R |
| 2,496,474 | 2/1950 | Hyman | 280/479 A |
| 2,978,042 | 4/1961 | Jones | 172/456 X |
| 3,588,139 | 6/1971 | Bayne | 172/456 X |
| 3,829,131 | 8/1974 | Moore | 280/493 |
| 3,844,358 | 10/1974 | Shuler et al. | 172/311 |

Primary Examiner—John A. Pekar
Attorney, Agent, or Firm—Merchant, Gould, Smith, Edell, Welter & Schmidt

[57] ABSTRACT

A hitch of modular construction adaptable for coupling to a tractor any number of implements from one to five, the hitch modules being pivotally interconnected and articulated for following uneven land surfaces, and being further provided with means for adjusting the hitch into a configuration convenient for transportation of the assembled implements.

17 Claims, 8 Drawing Figures

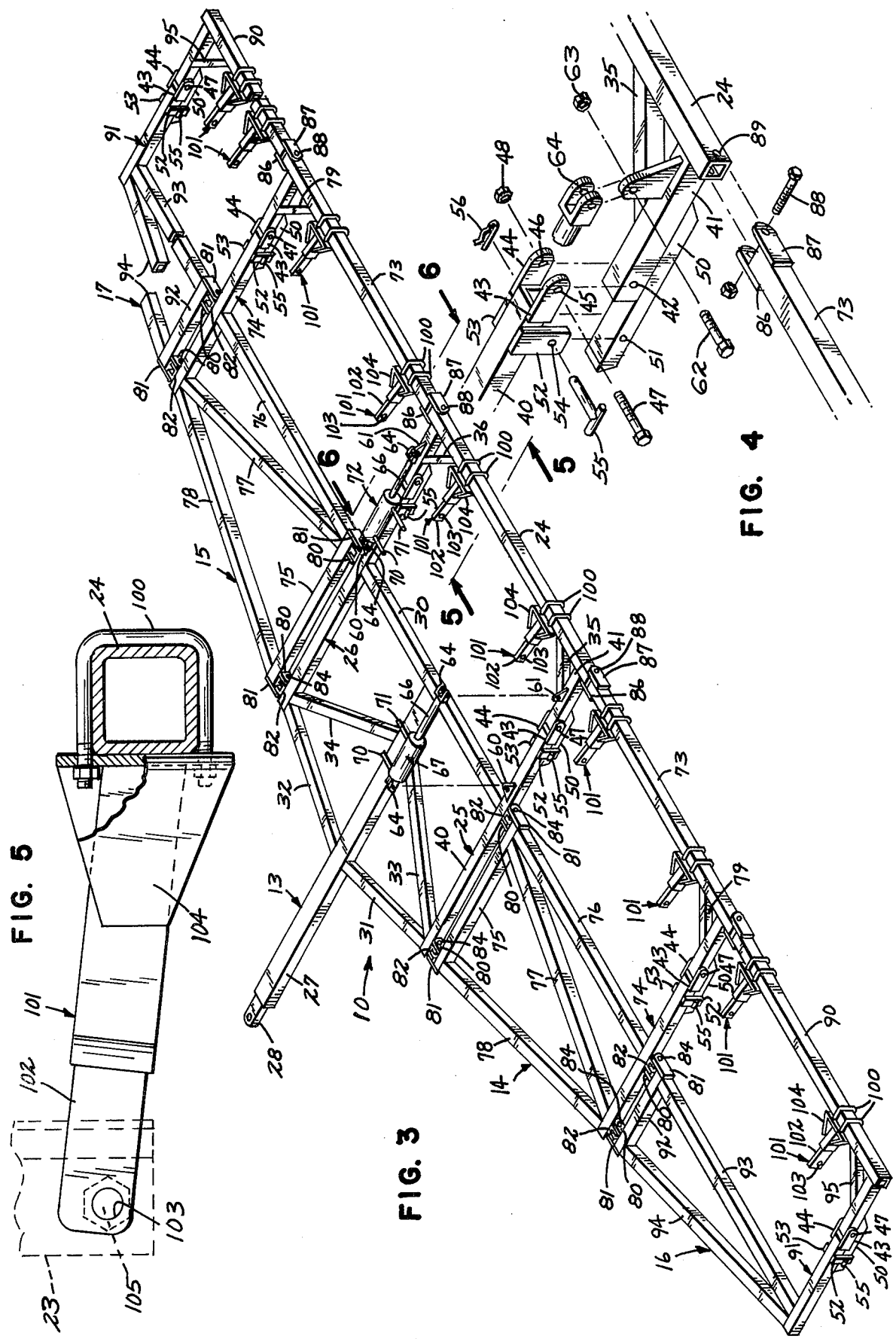

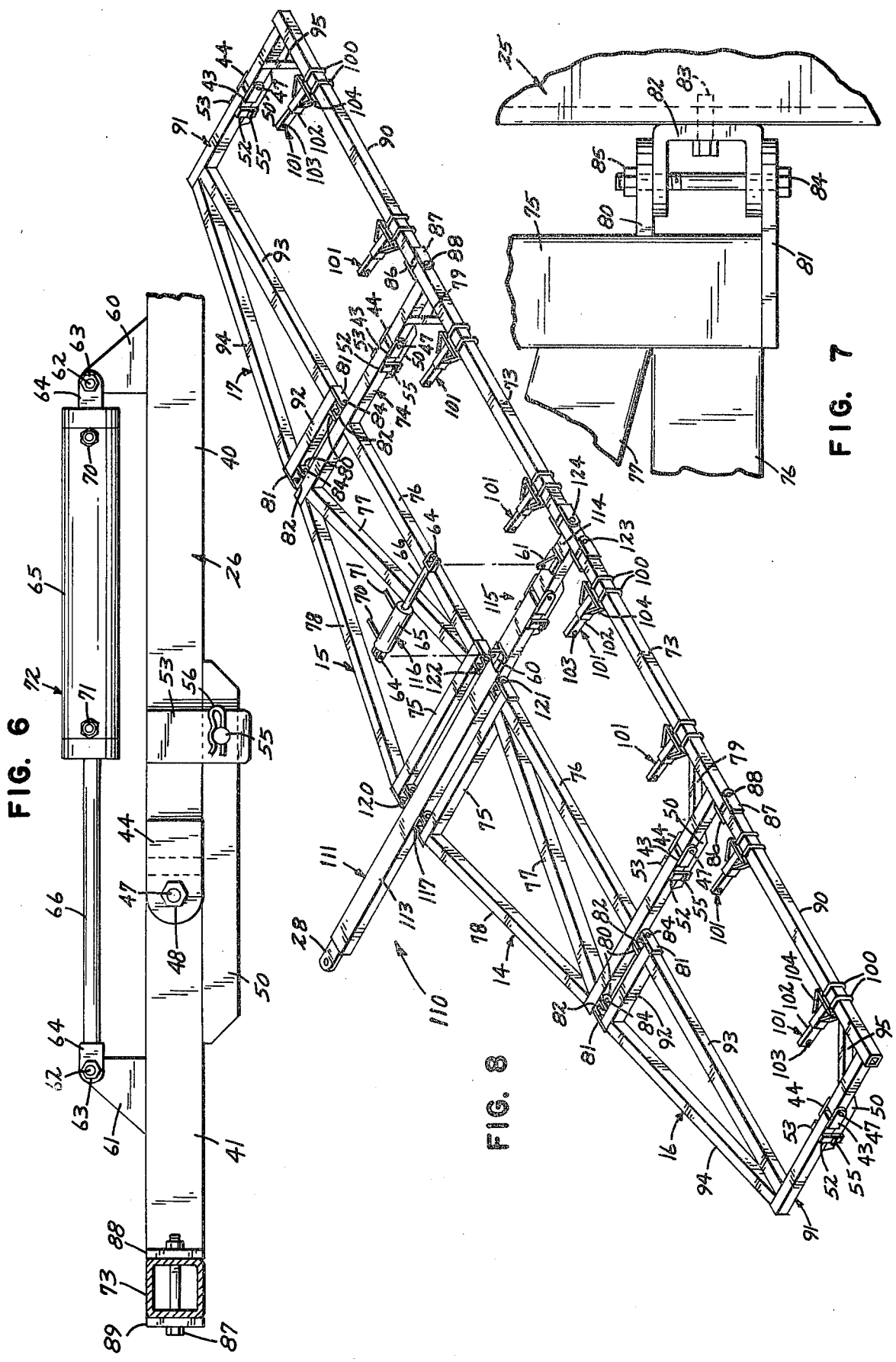

SECTIONAL GRAIN DRILL HITCH

BACKGROUND OF THE INVENTION

This invention relates to the field of agriculture and more particularly to apparatus for coupling plural implements in side-by-side relationship to be drawn by a single power unit. An individual press drill for example, may be 8 feet wide: it requires a tractor of only modest size, but also requires many passes to plant a large field. Five such drills connected together plant a field much more rapidly, but involve a much greater financial investment including the cost of a much more powerful tractor. The trade-off between labor costs and costs of equipment is a difficult one which must be made by each farmer on the basis of local conditions including the size and terrain of his fields and the cost and availability of labor skilled in machine operation.

SUMMARY OF THE INVENTION

This invention is designed to give greater flexibility and choice to the purchaser and user of farm machinery, by providing a modular hitch construction which can initially be adapted to a small number of drills, even a single drill, and can be augmented as additional drills are purchased. This avoids the expense of purchasing an entire new hitch when additional seeding equipment is obtained, and further gives the operator the choice of using different numbers of drills in different parts of his farm without requiring him to invest in several hitches to be used alternatively. The hitch construction is fully articulated to accommodate terrain which is other than flat, and also is provided with fluid actuated means for folding it inot a compact configuration to permit convenient transportation by flatbed vehicles of known types.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and the accompanying descriptive matter, in which there are illustrated and described certain preferred embodiments of the invention.

BRIEF DESCRIPTION OF THE DRAWING

In the drawing.

FIG. 3 is a perspective view of the hitch of FIG. 1 in greater detail, showing the construction used to draw an odd number of implements;

FIG. 4 is an exploded view of a portion of FIG. 3 to a larger scale;

FIG. 5 is a fragmentary sectional view taken along the lines 5—5 of FIG. 3;

FIG. 6 is a fragmentary sectional view taken along the lines 6—6 of FIG. 3;

FIG. 7 is a fragmentary view to a larger scale of a pivotal connection used in the structure of FIG. 3; and FIG. 8 is a view like FIG. 3 showing the construction used for drawing an even number of implements.

DESCRIPTION OF THE PREFERRED EMBODIMENTS

Figure 1:
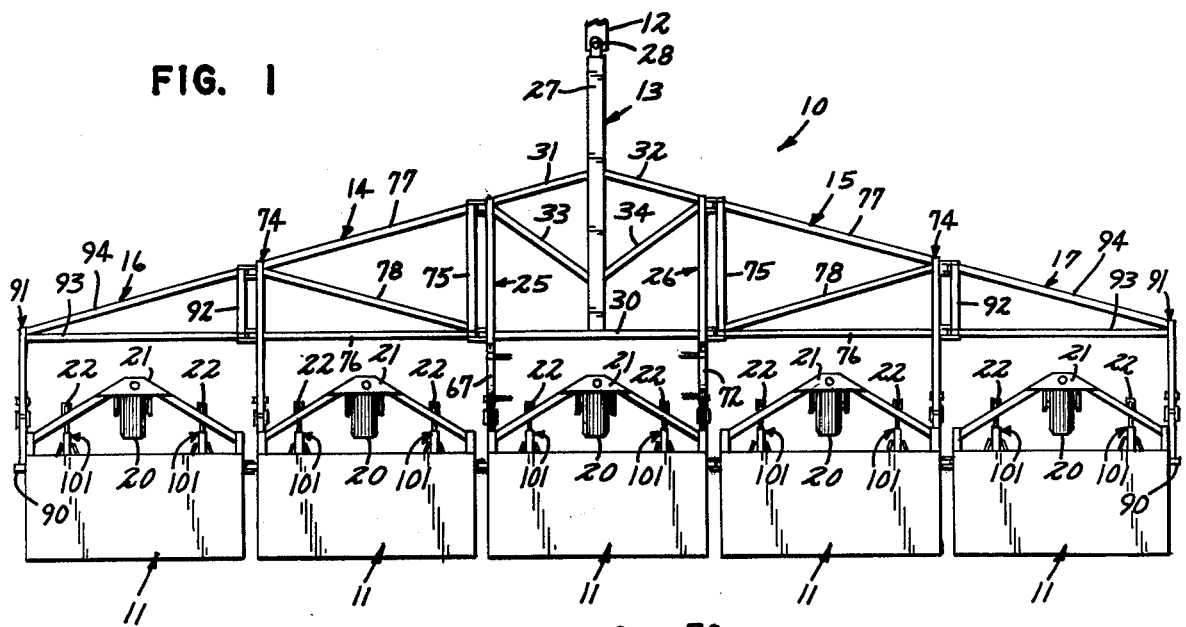
FIG. 1 is a plan view of a modular hitch according to my invention, shown in use with five drills.

Referring first to FIG. 1, my invention is shown as a hitch 10 for use in connecting an odd number (five) of press drills 11 to the drawbar 12 of a tractor of suitable power. Hitch 10 is shown to comprise a center module or drawbar unit 13, left and right, generally U-shaped intermediate modules or primary lateral units 14 and 15, and left and right, generally U-shaped outer modules or secondary lateral units 16 and 17. The drills may be of any commercially available type: the one used for illustration has a front wheel 20 castered to a supporting frame 21 from which depend mounting brackets 22 suitably braced as desired. The modules of hitch 10 are coupled to the lower ends of brackets 22 as will be described in detail in connection with FIG. 5.

Center module 13 (see FIG. 3) comprises a back-bar 24, left and right side-bars 25 and 26, a draft tongue 27 with an appropriate tractor coupling 28, a cross-bar 30, and diagonal braces 31,32,33,34,35 and 36 welded or otherwise suitably secured together to form a generally flat assembly which in use is generally horizontal.

Side-bar 25 is articulated, as shown in detail in FIG. 4, to have a front portion 40 and a rear portion 41. The latter is bored transversely at 42, and the former is provided with rearwardly extending lateral ears 43 and 44 also bored transversely at 45 and 46, so that a bolt 47 passing through bores 42,44 and 45 and secured by a nut 48 provides an axle for pivotal movement about a generally horizontal axis extending transversely of the hitch. A brace 50 is secured below portion 41 and extends beneath portion 40 to limit counterclockwise rotation of the latter with respect to the former. Brace 50 is transversely bored at 51, and portion 40 is provided with further, downwardly extending lips 52 and 53 transversely bored as shown at 54, so that a T-pin 55 may be passed through the bores and secured by a cotter key or hairpin 56, to hold portions 40 and 41 immovable relative to each other about the axis of bolt 47.

The upper surfaces of members 40 and 41 are provided with brackets 60 and 61 to which are pivotally connected as by bolts 62, nuts 63 and clevis 64, the body 65 and piston 66 of a linear fluid motor 67 having fluid connections 70 and 71 which are self-sealing when disconnected.

Side-bar 26 is constructed and equipped like side-bar 25, including a fluid motor 72.

Intermediate module 14 comprises a back-bar 73, a long side-bar 74 articulated a described in connection with bar 25, a short side-bar 75, a cross-bar 76, and diagonal bars 77, 78 and 79 welded or otherwise suitably secured together to form a generally flat assembly which is generally horizontal. The module is generally U-shaped, with a thin leg 73, a transverse member 74, and a thick leg 76-78. Short side-bar 75 of module 14 is pivotally connected near its ends to side-bar 25 of module 13 by ears 80 and 81 secured to member 75, brackets 82 secured to member 25 as by bolts 83, and pivot bolts 84 and nuts 85, for movement about the longitudinally extending common axis of bolts 84. The end of back-bar 73 is similarly connected to the end of back-bar 24 by ears 86 and 87 bored to pass a pivot pin 88 which also engages a bore 89 in member 24, for relative rotation about a longitudinal axis common with that of bolts 84: this allows the modules and hence the drills to follow unevenesses in the ground over which they are drawn.

Outer module 16 comprises a back-bar 90, a long side-bar 91 articulated as described in connection with bar 25, a short side-bar 92, a cross-bar 93, and diagonal bars 94 and 95. Short side-bar 92 of module 16 is pivotally connected at its ends to the side-bar 74 of module 14, and the end of back-bar 90 is similarly connected to the end of back-bar 73, for rotation about a common longitudinal axis, all as just described in connection with module 14.

Modules 15 and 17 are mirror images respectively, of modules 14 and 16. The bores 45, 46 and 51 in all of the long side-bar articulations are coaxial when the drills are on a level surface.

Projecting forward and slightly upward from back-bar 24, and secured thereto by U-bolts 100, ar a plurality of mounting brackets 101 each including a central bar 102 transversely bored as in 103, and carried in a triangular holder 104. Bars 102 engage mounting brackets 22 and 23 and are pivotally connected thereto by suitable pins 105. Similar mounting brackets are provided on back-bars 90, 73 and so forth.

The structures of FIGS. 1 and 3 are designed for modular use with an odd number of drills. To connect an even number of drills in this fashion would result in an unbalanced load on the tractor, in which the drills would follow in a skewed relationship and uniform coverage of the field would be difficult. A modified hitch for use with an even number of drills is shown in FIG. 8. It has the same outer and inner intermediate modules as in FIG. 3, differing only in its center module or drawbar unit 110, which comprises a single bar 111 also functioning as a draft tongue and having a coupling 28 at its free end. The bar is articulated to have a front portion 113 and a rear portion 114. The articulation 115 is as described in FIG. 3, and includes a single linear fluid motor 116. Pivots 117, 120, 121 and 122 are provided along the sides of bar portion 113, and pivots 123 and 124 are positioned at the rear end of portion 114, to provide connection to intermedite modules 14 and 15.

From the foregoing it will be evident that a farmer purchasing a hitch 10 according to FIG. 3 and an additional center module 110 according to FIG. 8 has the option of drawing any number of drills from one to five. For the most restricted applications and as an initial investment, center module 13 and a single drill may be used. When a second drill is purchased there is also purchased a center module 110 and intermediate modules 14 and 15. When a third drill is used no further hitch modules are needed. The addition of a fourth drill calls for the purchase of two outer modules 16 and 17, and the addition of a fifth drill calls for no further hitch modules. It will be appreciated that the power of the tractor available must also be considered when the number of drills is being determined.

Figure 2:
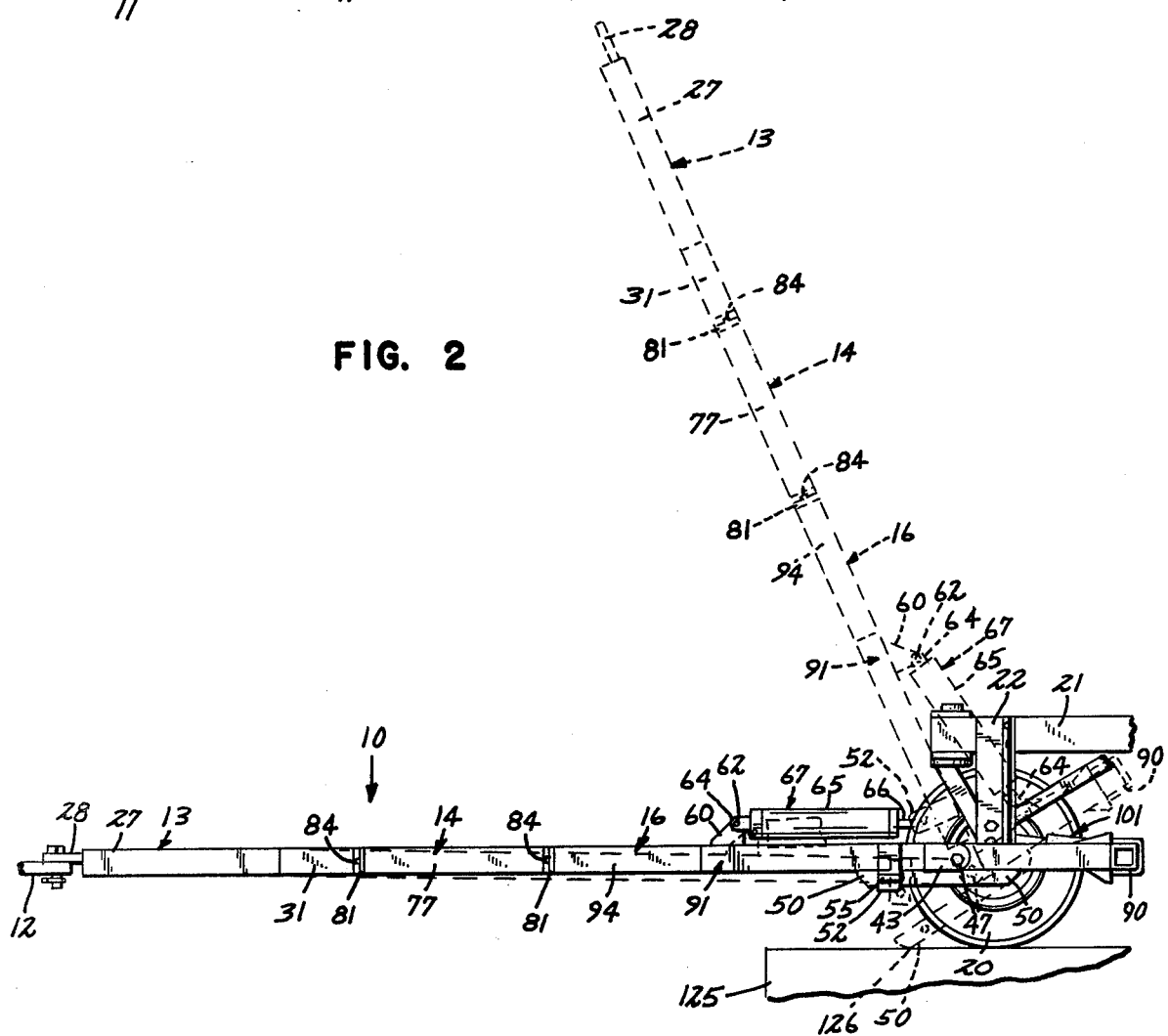
FIG. 2 is a fragmentary side view of the hitch in operating and transporting configurations.

The purpose of the articulations in the side-bars of the modules will now be explained. FIG. 2 shows in fragmentary fashion an implement 11 which has just been loaded crosswise onto a conventional flatbed transporter 125. It is clear that hitch 10 extends inconveniently far to the side of the transporter, but since the bed is level all the articulations are coaxial. T-pins 55 are drawn from the module articulations, and the tractor is backed slightly, allowing the articulations to pivot about the common axis and the connections to brackets 22 until the front ends of braces 50 engage the top of the flatbed as at 126. Coupler 28 may now be disconnected from drawbar 12, and hydraulic fluid may be supplied to motors 65 and 72, or to motor 116. The hitch now pivots at its articulations, raising its forward end to the position shown in broken lines in FIG. 2. The hydraulic hoses may now be disconnected, using standard self-closing equipment, so that the tractor is free from the implement and can be coupled to the transporter if it is desired. The hitch is maintained in its elevated position by the residual fluid trapped in each motor by the couplings.

From the foregoing it will be evident that I have invented a new and useful modular hitch made up of a selected number of standard modules which are pivoted together in side-by-side relation and articulated transversely to permit implements drawn thereby to have independent movement as required by the contours of the land being worked, together with means, including fluid motors and the transverse articulations, permitting the major portion of the hitch to be elevated and retained in a convenient configuration for highway transportation.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extend indicated by the broad general meaning of the terms in which the appended claims are expressed.

what is claimed is:

1. A hitch comprising:
   a drawbar unit articulated for pivotal movement about a first transverse axis and including releasable means normally preventing said pivotal movement about said first axis;
   and at least one pair of pivotal connection means mounted on said drawbar unit, and spaced oppositely from said first transverse axis thereof, at locations such that they define a common longitudinal axis of pivotal movement.

2. A hitch comprising:
   a drawbar unit articulated for pivotal movement about a first transverse axis and including releasable means normally preventing said pivotal movement about said first axis;
   and means for connecting said hitch to at least one wheeled implement in supported pivotal relation thereto about a second transverse axis, in which said drawbar unit comprises a generally rectangular structure having a draft tongue projecting from one of a first pair of opposite sides and having articulations in another pair of sides, near the other side of said first pair, to enable pivoting about said first axis.

3. A modular hitch comprising, in combination:
   a drawbar unit articulated for pivotal movement about a first transverse axis and including releasable means for normally preventing said pivotal movement about said first axis;
   means for connecting said hitch to a wheeled implement in supported pivotal relation thereto about a second transverse axis;
   and means positioned along said drawbar in front of and behind said first axis to receive a lateral unit for pivotal relative movement about a longitudinal axis.

4. The structure of claim 3 including a plurality of lateral units located on both sides of said drawbar unit.

5. The structure of claim 3 in which said drawbar unit comprises a generally rectangular structure having a draft tongue projecting from one of a first pair of opposite sides and having articulations in the other pair of sides, near the other side of said first pair, to enable said pivoting about said first axis.

6. The structure or claim 3 in which said lateral unit comprises a generally U-shaped structure pivotally connected at its open end to said drawbar unit, the transverse member of the U having an articulation coaxial with the articulation of said drawbar unit.

7. The structure of claim 3 in which said lateral unit comprises a generally polygonal first structure having a member in common with one leg of a generally U-shaped second structure, the other leg of the U and one side of the first structure being provided with coaxial pivot means for connection to said drawbar unit, and the transverse member of the U having an articulation coaxial with the articulation of said drawbar unit.

8. In an agricultural implement system in combination:
   a plurality of independently wheeled implements to be drawn by a common traction source;
   a drawbar unit;
   primary lateral units removably connected to said drawbar unit at longitudinally spaced sites therealong for pivotal movement with respect thereto about longitudinal axes;
   means connecting implements to at least said lateral units in supporting pivotal relation thereto about transverse axes;
   means articulating said units between said spaced sites for joint pivotal movement about a common transverse axis;
   and releasable means normally preventing said joint pivotal movement.

9. The structure of claim 8 including means connecting an implement to said drawbar unit in supporting pivotal relation thereto about a transverse axis.

10. The structure of claim 8 including secondary lateral units removably connected to said primary lateral units at lingitudinally spaced points therealong for pivotal movement about further generally horizontal longitudinal axes;
   means connecting implements to said secondary lateral units in supporting pivotal relation thereto about further transverse axes;
   and means articulating said secondary lateral units between said spaced sites for pivotal movement about said common transverse axis.

11. A modular hitch for agricultural implements comprising, in combination:
   a drawbar unit and a primary lateral unit;
   means for removably interconnecting said units for relative pivotal movement about a generally logitudinal horizontal axis;
   means articulating said units for pivotal movement about generally horizontal transverse axes which lie in a common plane transverse of said hitch when said units are interconnected;
   and fluid motor means for causing motion of articulation of said units toward and away from a limited position.

12. The structure of claim 11 including secondary lateral units removably interconnected with said primary unit for pivotal movement about a longitudinal axis, and articulated about an axis which lies in said plane when said units are interconnected.

13. A higch comprising in combination:
   a drawbar unit articulated for pivotal movement about a first transverse axis;
   a primary lateral unit articulated for pivotal movement about a second transverse axis;
   releasable means normally preventing said pivotal movement about said transverse axes;
   means removably interconnecting said units, with said transverse axes lying in a common plane transverse to said hitch, for relative pivotal movement, about a longitudinal axis normal to said common plane, said units being so articulated that said transverse axes pass through a relation in which they coincide;
   and means for connecting at least one of said units to a wheeled implement in supported pivotal relation thereto about a further transverse axis.

14. A modular hitch comprising, in combination:
   a central drawbar unit articulated about a transverse horizontal axis;
   a primary lateral unit removably and pivotally connected to said drawbar unit at at least two sites longitudinally spaced therealong and articulated coaxially with said drawbar unit;
   a secondary lateral unit removably and pivotally connected to said primary lateral unit at points longitudinally spaced therealong, and articulated coaxially with said drawbar unit;
   and means for connecting at least one of said units to a wheeled implement in supported pivotal relation thereto about a further transverse axis.

15. A modular hitch connecting a traction vehicle in draft relation to a plurality of independently wheeled implements in general side-by-side relationship, comprising, in combination:
   a center module and at least one lateral module, each of said modules including a front portion, a rear portion, articulating means interconnecting said portions for relative pivotal movement about a transverse axis, and releasable means normally disabling said articulating means and locking said portions in a generally flat relative configuration;
   means for connecting the front portion of said center module in supported relation to a traction vehicle;
   means interconnecting said modules laterally along adjacent edges thereof, with said transverse axes lying in a common plane transverse to said hitch, for relative pivotal movement about at least one longitudinal axis;
   and means for connecting a wheeled vehicle in supporting relation to the rear portions of at least one of said modules for pivotal movement with respect thereto about a further transverse axis.

16. The structure of claim 15 and motor means for applying torque between said portions of one of said modules about said transverse axis thereof.

17. a modular hitch for connecting a traction vehicle in draft relation to a plurality of independently wheeled implements in general side-by-side relationship, comprising, in combination:
   a center module, a primary lateral module, and a secondary lateral module, each of said modules including a front portion, a rear portion, articulating means interconnecting said portions for relative pivotal movement about a transverse axis, and releasable means normally disabling said articulating means and locking said portions in a generally flat relative configuration;

means for connecting the front portion of said center module in supported relation to a traction vehicle;

means interconnecting said modules laterally along adjacent edges thereof, with said transverse axes lying in a common plane transverse to said hitch, for relative pivotal movement about longitudinal axes normal to said plane;

and means for connecting wheeled vehicles in supporting relation to the rear portions of said lateral modules for pivotal movement with respect thereto about further transverse axes.

* * * * *